(12) United States Patent
Oohashi et al.

(10) Patent No.: US 8,332,149 B2
(45) Date of Patent: Dec. 11, 2012

(54) NAVIGATION DEVICE, METHOD, AND PROGRAM

(75) Inventors: Yusuke Oohashi, Sapporo (JP); Daisuke Sakaki, Sapporo (JP); Yohei Ando, Kasugai (JP)

(73) Assignee: Aisin AW Co., Ltd., Anjo (JP)

( * ) Notice: Subject to any disclaimer, the term of this patent is extended or adjusted under 35 U.S.C. 154(b) by 394 days.

(21) Appl. No.: 12/656,939

(22) Filed: Feb. 19, 2010

(65) Prior Publication Data

US 2010/0217517 A1    Aug. 26, 2010

(30) Foreign Application Priority Data

Feb. 26, 2009    (JP) ................................ 2009-043792

(51) Int. Cl.
*G01C 21/36* (2006.01)
(52) U.S. Cl. ........................ 701/533; 701/532
(58) Field of Classification Search .................. 701/412, 701/408, 410, 411, 417, 446, 468, 469, 473, 701/527, 529, 532, 533, 409, 454; 342/357.25, 342/357.31, 357.45, 357.48; 340/988, 990, 340/995.21, 995.25
See application file for complete search history.

(56) References Cited

U.S. PATENT DOCUMENTS

| 5,483,456 | A | 1/1996 | Kuwahara et al. |
| 6,728,392 | B1 * | 4/2004 | Joshi .............................. 382/104 |
| 2002/0161523 | A1 * | 10/2002 | Endo ............................. 701/213 |
| 2002/0177950 | A1 * | 11/2002 | Davies .......................... 701/213 |

FOREIGN PATENT DOCUMENTS

JP    A-6-148307    5/1994

* cited by examiner

*Primary Examiner* — Thomas Black
*Assistant Examiner* — Marthe Marc-Coleman
(74) *Attorney, Agent, or Firm* — Oliff & Berridge, PLC

(57) ABSTRACT

Devices, methods, and programs correct an estimated path found by dead reckoning navigation. A point correlation value s is calculated based on a distance to a reliability circle whose radius is a speculative maximum error e that indicates a distance of an error range with respect to a GPS position. A correlation value Sp of an estimated path and a correlation value Sq of a candidate path are calculated from cumulative values of the point correlation values s. A correction that moves the estimated path is not performed if the correlation value Sq of the candidate path becomes worse than the correlation value Sp of the estimated path, and the correction of the estimated path is performed if the correlation value Sq of the candidate path does not become worse than the correlation value Sp of the estimated path. Thus, false matching can be further reduced, and the travel path can be suitably corrected.

13 Claims, 13 Drawing Sheets

FIG. 2A

| RELIABILITY | HEADING | DISTANCE |
|---|---|---|
| 5 | WITHIN APPROX. 1 DEG [°] | WITHIN APPROX. 5 [m] |
| 4 | WITHIN APPROX. 3 DEG [°] | WITHIN APPROX. 10 [m] |
| 3 | WITHIN APPROX. 10 DEG [°] | WITHIN APPROX. 25 [m] |
| 2 | WITHIN APPROX. 45 DEG [°] | WITHIN APPROX. 50 [m] |
| 1 | UNKNOWN | UNKNOWN |

FIG. 2B

| NO | ITEM | ESTIMATED RELIABILITY | | GPS RELIABILITY | |
|---|---|---|---|---|---|
| | | HEADING | DISTANCE | HEADING | DISTANCE |
| 1 | PREVIOUS RELIABILITY | O | O | | |
| 2 | SPECULATIVE CUMULATIVE HEADING ERROR | O | | | |
| 3 | GYRO SENSITIVITY LEARNING CONDITION | O | | | |
| 4 | ESTIMATED HEADING RELIABILITY | | O | | |
| 5 | DISTANCE COEFFICIENT LEARNING CONDITION | | O | | |
| 6 | GPS/ESTIMATED PATH HEADING COINCIDENCE | | | O | |
| 7 | SPEED | | | O | |
| 8 | HDOP | | | O | O |
| 9 | GPS/ESTIMATED PATH LOCATION COINCIDENCE BASED ON INTER-COORDINATE DISTANCES | | | | O |
| 10 | GPS/ESTIMATED PATH LOCATION COINCIDENCE BASED ON INTER-COORDINATE HEADINGS | | | | O |

F I G . 3

| RELIABILITY | PREVIOUS RELIABILITY | CUMULATIVE HEADING ERROR [°] | GYRO SENSITIVITY LEARNING STATE | ESTIMATED HEADING RELIABILITY | DISTANCE COEFFICIENT LEARNING STATE |
|---|---|---|---|---|---|
| 1 | 1 | 45~ | UNLEARNED | 1 | UNLEARNED |
| 2 | 2 | 10~45 | 1~10 | 2 | 1~10 |
| 3 | 3 | 3~10 | 11~20 | 3 | 11~20 |
| 4 | 4 | 1~3 | 21~30 | 4 | 21~30 |
| 5 | 5 | 0~1 | 31 OR MORE | 5 | 31 OR MORE |

FIG. 4

| RELIABILITY | GPS/ESTIMATED PATH HEADING COINCIDENCE (AVG. HEADING DIFFERENCE [°]) | SPEED [km/h] | HDOP | GPS/ESTIMATED PATH POSITION COINCIDENCE BASED ON INTER-COORDINATE DISTANCES (CORRELATION VALUE) | GPS/ESTIMATED PATH POSITION COINCIDENCE BASED ON INTER-COORDINATE HEADINGS (CORRELATION VALUE) |
|---|---|---|---|---|---|
| 1 | 20 OR MORE | 0 | 4.1~ | 41 OR MORE | 41 OR MORE |
| 2 | 11~20 | 1~10 | 3.1~4.0 | 31~40 | 31~40 |
| 3 | 6~10 | 11~20 | 2.1~3.0 | 21~30 | 21~30 |
| 4 | 1~5 | 21~30 | 1.1~2.0 | 11~20 | 11~20 |
| 5 | 0 | 31~ | 1.0 | 0~10 | 0~10 |

NAVIGATION DEVICE, METHOD, AND PROGRAM

INCORPORATION BY REFERENCE

The disclosure of Japanese Patent Application No. 2009-043792, filed on Feb. 26, 2009, including the specification, drawings and abstract is incorporated herein by reference in its entirety.

BACKGROUND

1. Related Technical Fields

Related technical fields include navigation devices, methods, and programs that perform map matching for navigation.

2. Related Art

On-vehicle navigation devices that find a travel route to a destination and guide the vehicle are widely used. This type of navigation device identifies the current position of the vehicle, displays the vehicle's current position on a map, and provides travel guidance. Types of sensors used for identifying the current position include gyro, vehicle speed pulse, and acceleration sensors, and an estimated path is generated from the sensor information using dead reckoning navigation.

Shape matching of the generated estimated path and road information stored in a DB (database) is performed, and a position where the two coincide is identified as the current position. A current position mark that represents the host vehicle position is displayed at the identified current position. In this case, a position correction is performed so as to move the entire estimated path such that an estimated current position aligns with the current position on the road where the estimated path and the road information coincide. When matching an estimated path based on dead reckoning navigation with a shape based on road information as described above, if the shapes of the estimated path and the road information are compared and coincide, then a match may be made to the wrong position as a consequence.

GPS is used for measuring an absolute position (latitude, longitude) of the vehicle. GPS information is mainly used in sensor learning, but is often not used for position correction during normal updating of the current position. This is because multipath or similar effects, a weakness of GPS, may reduce the accuracy.

Japanese Patent Application Publication No. JP-A-H06-148307 proposes art that performs matching using GPS. According to JP-A-H06-148307, a GPS positioning error is calculated and a circle is set with the positioning location based on GPS as its center and the GPS positioning error as its radius. Candidates outside the circle are removed as possible matches, and only candidates inside the circle are considered as possible matches in order to reduce the processing load.

SUMMARY

However, the art described in JP-A-H06-148307 performs matching and position correction in units of the current position, but does not correct the entire estimated path. Candidates outside the circle whose radius is the GPS positioning error are uniformly removed as possible matches. However, the path of a candidate may be removed from consideration in the matching process, because the candidate is no longer considered a possible match due to a change in the error radius that is caused by a temporary change in the GPS accuracy. Therefore, a determination cannot be made as to the suitability of the entire path (inside a definite segment) of the candidate removed from matching consideration. Consequently, the travel path overall may not be suitably corrected.

Exemplary implementations of the broad inventive principles described herein further reduces false matching and suitably corrects a travel path.

According to exemplary implementations, a point correlation value s is calculated based on a distance to a reliability circle whose radius is a speculative maximum error e that indicates a distance of an error range with respect to a GPS position. A correlation value Sp of an estimated path and a correlation value Sq of a candidate path are calculated from cumulative values of the point correlation values s. A correction that moves the estimated path is not performed if the correlation value Sq of the candidate path becomes worse than the correlation value Sp of the estimated path, and the correction of the estimated path is performed if the correlation value Sq of the candidate path does not become worse than the correlation value Sp of the estimated path. Thus, false matching can be further reduced, and the travel path can be suitably corrected.

Exemplary implementations provide devices, methods, and programs that acquire a plurality of GPS positions based on GPS positioning and acquire a plurality of estimated positions and a plurality of candidate positions based on dead reckoning navigation, each of which respectively correspond to the acquired GPS positions. The devices, methods, and programs determine an estimated path that is made up of the plurality of estimated positions, determine a candidate path that is made up of the plurality of candidate positions, and acquire a speculative maximum error that specifies a distance of an error range with respect to each GPS position. The devices, methods, and programs calculate a point correlation value for each estimated position based on a distance between the estimated position and a reliability circle, the reliability circle having a radius equal to the acquired speculative maximum error, and calculates a correlation value of the estimated path that is a cumulative value of point correlation values calculated for each of the plurality of estimated positions. The devices, methods, and programs calculate a correlation value for each candidate position based on a distance between the candidate position and the reliability circle, calculate a correlation value of the candidate path that is a cumulative value of the point correlation values calculated for each of the plurality of candidate positions, and performs a correction of the estimated path that moves the estimated path if the correlation value of the candidate path is equal to or less than the correlation value of the estimated path, but does not perform the correction if the correlation value of the candidate path is greater than the correlation value of the estimated path.

BRIEF DESCRIPTION OF THE DRAWINGS

FIGS. 2A and 2B are explanatory drawings that outline factors and definitions of reliability;

FIG. 3 is an explanatory drawing of factors that determine the reliability of an estimated heading and distance;

FIG. 4 is an explanatory drawing of factors that determine the reliability of a GPS heading and distance;

DETAILED DESCRIPTION OF EXEMPLARY IMPLEMENTATIONS

Figure 1:
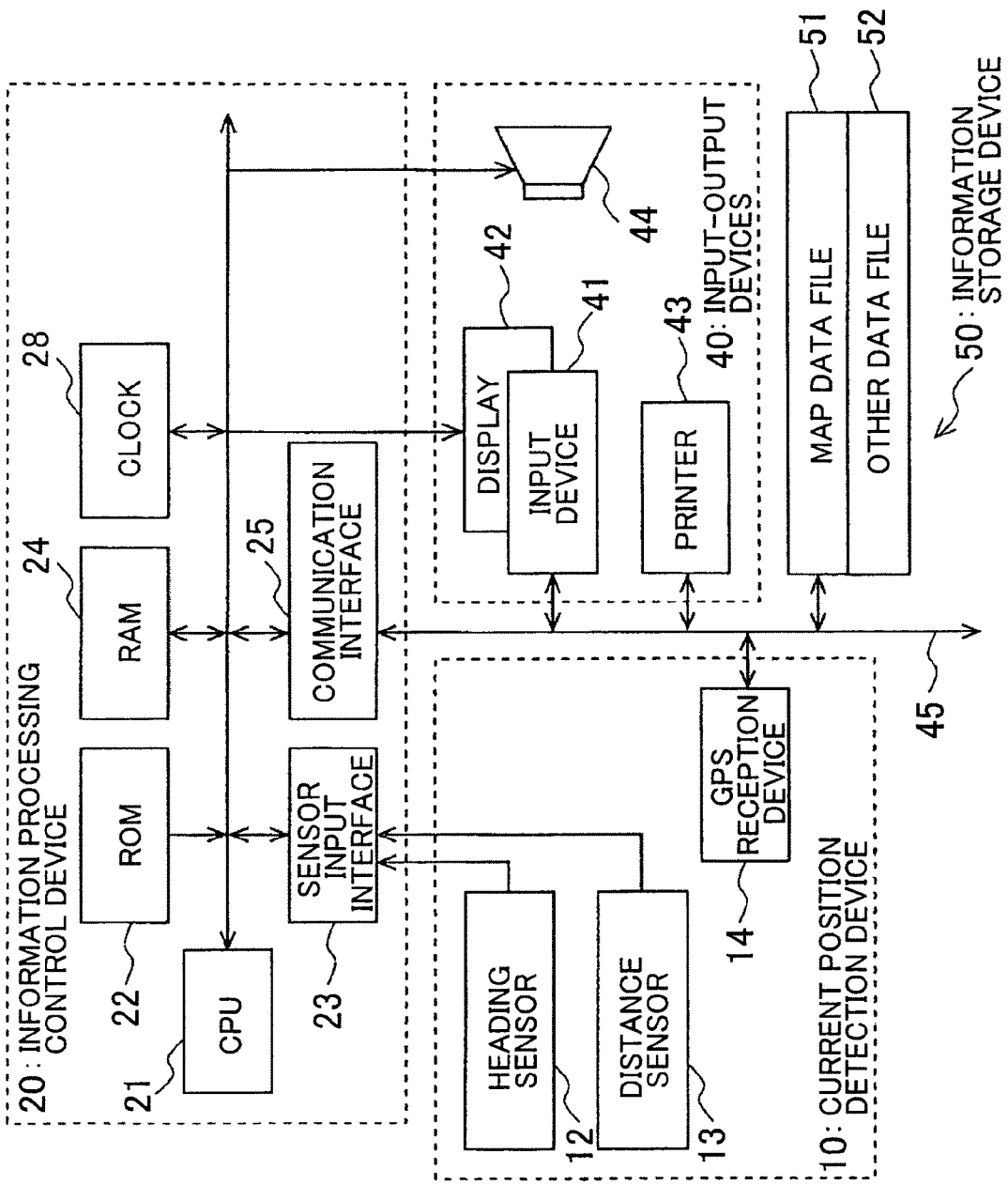
FIG. 1 is a system diagram of a navigation device according to an example.

An example of a navigation device and a navigation program according to the present invention will be described in detail below with reference to FIGS. 1 to 13C.

I. Overview of the Example

In the navigation device of the present example, a travel path (estimated path) is found by dead reckoning navigation. Based on a correlation value with a GPS path, a position correction that moves the estimated path to the path of candidate points set on a road and a heading correction that rotates the travel path at a predetermined position (e.g. a uth previous candidate point) are performed. Namely, the GPS path is calculated based on GPS positioning, and a correlation value of the estimated path before and after correction is calculated with respect to the GPS path of a predetermined distance. A correction is not made if the correction worsens the correlation value, but the estimated path is corrected if the correction improves the correlation value.

The correlation value of the estimated path with respect to the GPS path is calculated as follows.

First, points (estimated positions) on the estimated path that correspond to GPS-based measurement positions (GPS positions) and candidate points on a road that correspond to these estimated positions are calculated. The candidate points are set on a road within a predetermined distance from the estimated positions, and the candidate points (candidate estimated positions) are found by moving the candidate points on the road by a movement distance that corresponds to the movement of the vehicle. The candidate points are also set corresponding to the GPS positions, and the path of the candidate points becomes the candidate path. A reliability circle is then calculated that has a GPS position as its center and a distance (speculative maximum error e), which specifies a degree of error calculated based on the GPS measurement accuracy, as its radius. Square values of the distances from the estimated position and the candidate point, which correspond to the GPS position, to the reliability circle are respectively set as a point correlation value s for the two points.

A correlation value Sp of a pre-correction estimated path with respect to the GPS path and a correlation value Sq of the candidate path based on the candidate points are calculated by totaling the point correlation values s for the respective candidate points and estimated positions with respect to the GPS positions measured in the predetermined distance segment. If the correlation value Sp of the estimated path with respect to the GPS path becomes worse (becomes a larger value) than the correlation value Sq of the estimated path (candidate path) based on the candidate points, the estimated path is not corrected (the estimated positions are not moved to the corresponding candidate points). However, if the correlation value Sp improves (becomes smaller), the estimated path is corrected to the candidate path. In other words, the candidate path is set as the post-correction estimated path.

Thus, the correlation value of the estimated path before and after correction with respect to the GPS path in a predetermined segment is considered in addition to the reliability of the GPS positioning location. Therefore, the estimated path can be left at a more accurate position, which consequently improves the accuracy of a host vehicle position.

II. Details of the Example

FIG. 1 is a system configuration diagram of the navigation device in which the present example is used. The navigation device is installed in a vehicle and, as shown in FIG. 1, includes a current position detection device 10, an information processing control device 20, input-output devices 40, and an information storage device 50.

The current position detection device 10 is structured as follows.

A heading sensor 12 detects an angle that changes relative to a reference angle (absolute heading). The present example employs a gyro sensor that uses angular velocity to detect angular variation. Note that the heading sensor 12 may be an optical rotation sensor that is attached to a rotating portion of the steering wheel, a rotating type of resistance volume, or an angle sensor that is attached to a wheel portion of the vehicle. The heading sensor 12 is a geomagnetic sensor that detects the direction in which the vehicle is facing, by using a magnet to detect the direction north, for example. The heading sensor 12 may be any unit that detects an absolute heading.

A distance sensor 13 can measure the movement distance of the vehicle, and may detect and count rotations of the wheel or detect and integrate twice an acceleration, for example. A GPS (Global Positioning System) reception device 14 receives signals from an artificial satellite, and is capable of obtaining various information such as the signal transmission time, positional information relating to the reception device, the movement speed of the reception device and the advancing direction of the reception device.

The information processing control device 20 is a device for performing computations and control on the basis of information input from the current position detection device 10 and the input-output devices 40 and information stored in the information storage device 50, and performing control to ensure that the computation results are output to an output unit such as a display 42, a printer 43, or a speaker 44.

The information processing control device 20 is structured as follows.

A CPU (central processing unit) 21 performs overall computations and control for the entire navigation device. A ROM 22 stores various programs such as programs relating to navigation, including route searches to a destination and display and voice guidance, and map matching processing programs according to the present example that perform corrections based on a correlation value of an estimated path with respect to a GPS path based on a GPS reliability circle. The ROM 22 may be divided into a first ROM and a second ROM, wherein navigation programs relating to voice guidance are stored in the second ROM and the other programs are stored in the first ROM. Reliability data described later is defined in the map matching program of the present example. However, a reference table of reliability data may be provided independent of the program and reliability data referenced over the course of executing the program, or reliability data files may be saved to the information storage device 50. A RAM 24 stores information that the user inputs, such as destination information, information on a point that the vehicle passes, and the like that are input from an input device 41. The RAM 24 is also a storage unit for storing the results of computations that the CPU 21 makes based on the information that is input by the user, route search results, and map information that is read in from the information storage device 50. In addition, the RAM 24 temporarily saves various data such as a GPS position, an estimated position, a correction estimated position, and various paths based on these positions, which are to be used in map matching according to the present example.

A communication interface 25 inputs and outputs various information through a transmission line 45. More specifically, the GPS reception device 14, the input device 41, the printer 43, and the information storage device 50 are connected through the transmission line 45. A clock 28 keeps time.

An image processor dedicated to image processing and used for processing vector information that is processed by the CPU 21 into image information, an image memory that stores the image information processed by the image processor, and an audio processor dedicated to audio processing and used for processing audio information read in from the information storage device 50 and outputting to the speaker 44 may be additionally provided.

The input-output devices 40 include the input device 41, the display 42, the printer 43, and the speaker 44. The user uses the input device 41 to input data such as a destination, a point that the vehicle passes, a search condition, and the like. The display 42 displays an image. The printer 43 prints information. The speaker 44 outputs the audio information. The input device 41 includes a touch panel, a touch switch, a joystick, a key switch, or similar, for example. The display 42 displays a map of the periphery of the current location and a travel route to the destination. Note that the input-output devices 40 may not include the printer 43.

The information storage device 50 is connected to the information processing control device 20 through the transmission line 45. The information storage device 50 stores a map data file 51 and an other data file 52. The information storage device 50 is generally configured from an optical storage medium such as a DVD-ROM or a CD-ROM, or from a magnetic storage medium such as a hard disk or the like, but it may also be configured from any one of various types of storage media, such as a magneto optical disk, various types of semiconductor memory, or the like. Note that the information storage device 50 may be configured from a rewritable hard disk, flash memory or the like for information requiring rewriting, and a ROM such as a CD-ROM or DVD-ROM used for other static information.

The map data file 51 stores map data, road data, destination data, guidance point data, and other data as various data required for map display, route searching, and route guidance in navigation. As map data, a national road map, road maps of various regions, residential maps, and the like are stored. The road maps include various types of roads, such as main arterial roads, expressways, secondary roads, and the like, as well as terrestrial landmarks (facilities and the like). The residential maps include graphics that show the shapes of terrestrial structures and the like, as well as street maps that indicate street names and the like. The secondary roads are comparatively narrow roads with rights of way that are narrower than the prescribed values for national routes and prefectural routes. The map data includes a map with a fixed range according to a predetermined scale, which includes the vehicle current position and points instructed by the user and is displayed on the display 42. The current position of the vehicle and instructed points are displayed on the map. The road data includes node data and link data, which are data relating to roads such as road locations and types, the number of vehicle lanes, and connection relationships between roads. The road data is used in route searching and map matching, and also used when a travel route found is displayed superimposed on the map data.

The node data represents geographical coordinate data of nodes that are used for route searches on maps. For example, connection points of roads such as intersections are represented by nodes, and roads between connection points (that is, non-branching areas of roads) are expressed by links. Thus, the node data also functions as route data that represents route connection relationships. Attributes expressing traffic regulations that constrain travel, including no entry and one-way traffic, are assigned to the links, and such attributes may also be assigned to intersection nodes. The node data includes intersection nodes that are always set for intersections, and auxiliary nodes that may be secondarily set at characteristic points between intersections (e.g. points that specify the start, middle and end of curves, points where the elevation changes, and the like). Intersection nodes include information relating to intersections, such as the names and geographical position coordinates of intersections. The destination data includes the names and locations of major tourist areas, buildings, facilities, places such as companies and sales offices that are listed in telephone directories and that are highly likely to become destinations, and the like. The guidance point data is guidance data for points requiring guidance, including guidance on branch points and the content of guide signs placed along roads. The other data file 52 stores image data of photographs that show various facilities and tourist areas as well as locations that require a visual display such as a major intersection, and audio data for when a set travel route is guided by audio.

Next, reliability data that is defined in the map matching program of the present example will be described.

FIGS. 2A and 2B outline definitions and factors of reliability. FIG. 2A specifies speculative errors for heading and distance with respect to reliability in the present example. With regard to heading, a speculative heading error of within 1 degree is assigned a reliability of 5, a speculative heading error of within 3 degrees is assigned a reliability of 4, a speculative heading error of within 10 degrees is assigned a reliability of 3, a speculative heading error of within 45 degrees is assigned a reliability of 2, and an unknown speculative heading error is assigned a reliability of 1. With regard to distance, a speculative distance error of within 5 meters is assigned a reliability of 5, a speculative distance error of within 10 meters is assigned a reliability of 4, a speculative distance error of within 25 meters is assigned a reliability of 3, a speculative distance error of within 50 meters is assigned a reliability of 2, and an unknown speculative distance error is assigned a reliability of 1.

As described above, five levels of reliability are assigned for both heading and distance in the present example. However, more levels of reliability (e.g. 10 levels) may be assigned. Note that the speculative errors (for heading and distance) are specified in advance using actual measurements of values for each factor of reliability and error in each case.

FIG. 2B shows factors used for determining the reliability of the estimated heading and estimated distance, and the reliability of the heading and distance based on GPS. As shown in the figure, factors that determine the estimated (heading, distance) reliability include: previous reliability, speculative cumulative heading error, gyro sensitivity learning state, estimated heading reliability, and distance coefficient learning state. Factors that determine the GPS (heading, distance) reliability include: GPS/estimated path heading coincidence, speed, DOP, GPS/estimated path position coincidence based on inter-coordinate distances, and GPS/estimated path position coincidence based on inter-coordinate headings.

As FIG. 2B shows, the reliability of the estimated heading is determined from the previous reliability, the speculative cumulative heading error, and the gyro sensitivity learning state. The reliability of the estimated distance is determined from the previous reliability, the estimated heading reliability, and the distance coefficient learning state. The reliability of the GPS heading is determined from the GPS/estimated path heading coincidence, speed, and DOP. The reliability of the GPS distance is determined from the DOP, the GPS/estimated path position coincidence based on the inter-coordinate distances, and the GPS/estimated path position coincidence based on the inter-coordinate headings.

FIG. 3 specifies factors that determine the reliability of the estimated heading and distance. For the previous reliability, as shown in FIG. 3, the reliability of the estimated heading and the reliability of the estimated distance calculated during the previous map matching are used without modification. This is because, barring a gyro failure, the reliability of the estimated heading calculated by dead reckoning navigation is unlikely to change drastically, so the previous reliability is used unchanged.

Normally, if the right and left sides of the navigation device are horizontally installed, the right and left sensitivities of the gyro sensor are practically equal. Consequently, if the right and left sensitivities of the gyro sensor become unequal, there is a high probability that learning for right-left sensitivity will be wrong and result in errors when the heading changes. Hence, because the heading error is likely to accumulate and grow with respect to heading variations while traveling a predetermined segment (e.g. 10 meters), the speculative cumulative heading error is set such that the reliability decreases as the cumulative heading error (degree) increases.

In the present example, the heading error rate is set as 0.1% for a right-left sensitivity difference of 1°. Thus, a product value from multiplying a gyro sensor right-left sensitivity difference of a° by 0.001 is accumulated each time the vehicle travels a predetermined segment. Note that a post-correction right-left sensitivity difference based on gyro sensitivity learning described next is used as the right-left sensitivity difference. The gyro sensitivity learning state represents the number of times of sensitivity learning with respect to the gyro sensor. The accuracy of the estimated heading can be considered low if the number of times of sensitivity learning is small, and the accuracy can be considered high if the number of times of sensitivity learning is large. Therefore, the reliability is set so as to increase in accordance with an increase in the number of times of learning.

Regarding the number of times of gyro sensor sensitivity learning in the present example, learning for a left turn and learning for a right turn are considered a set and counted as one time. Here, the gyro sensitivity learning corrects the sensitivity of the gyro sensor with respect to right and left turns, and is performed using various common methods. For example, angles calculated from the gyro sensor during right and left turns may be corrected by angles calculated from a travel path based on GPS positioning. Corrections made based on GPS positioning with low accuracy may reduce the sensitivity. Therefore, this learning is performed during right and left turns when the GPS positioning has high accuracy.

Such learning may use a GPS speed of 30 km/h or more and an error circle calculated from DOP having a diameter of 100 meters or less as learning start conditions. Note that the absence of buildings of at least a predetermined height around the vehicle current position may be further added as a learning start condition. The estimated heading reliability is used for calculating the reliability of the estimated distance. If the estimated heading reliability is high, then the accuracy of the estimated distance can also be considered high. Therefore, the estimated heading reliability (a final value calculated from various factors) is used without modification.

The distance coefficient learning state represents the number of times of learning with respect to distance. The accuracy of the distance coefficient can be considered high (the accuracy of the estimated distance can be considered high) if the number of times of learning is large, so the reliability of the estimated distance is also set high. Here, distance learning may also use various common methods similar to the gyro sensitivity learning. For example, using the movement distance of the vehicle calculated from GPS positioning as a reference, the number of distance pulses output by the distance sensor that measures the traveling distance of the vehicle is counted, and the number of times the movement distance was calculated for one distance pulse is set as the number of times of learning. The movement distance per one distance pulse is statistically determined based on the most common value among a distribution of movement distances calculated in each learning. Note that similar to gyro learning, distance learning is performed when the GPS accuracy is high and learning start conditions must be satisfied while the vehicle moves a predetermined distance. FIG. 4 specifies the factors that determine the reliability of the GPS heading and distance.

The GPS/estimated path heading coincidence determines the degree of coincidence of the path shape according to GPS and the estimated path shape. If the variation amount of the estimated heading and the variation amount of the GPS heading are similar (if the difference is small), the accuracy of the GPS heading can be considered high. Therefore, as shown in FIG. 4, the reliability of the GPS heading is set so as to increase with a higher degree of coincidence of both headings.

Here, the GPS/estimated path heading coincidence is calculated as follows.

(a) A GPS reliability calculation position (latest GPS positioning point) is designated as a base point. A base point for the estimated path is similarly set to a position that is synchronized with the GPS base point.

(b) A maximum of 20 GPS positioning points are acquired at positioning point intervals from the base point, and a heading variation amount from the base heading is acquired for each positioning point. At such time, the GPS continuity (positioning interval) is set to within 5 seconds (with processing executed even when positioning is not performed for 2 or 3 seconds). Likewise for the estimated path, the heading variation amount from the base heading is acquired for each point corresponding to the positioning points (the estimated path coordinates are synchronized with the GPS positioning location).

(c) The differences between corresponding positioning points are calculated for each of the acquired heading variation amounts of the GPS and estimated path, and summed to calculate an average value (correlation value). This correlation value is the average heading difference (°) in FIG. 4. Note that only GPS headings corresponding to a GPS heading reliability of 2 or more are acquired. If the GPS speed is fast, the accuracy of the GPS heading can be considered to increase. Therefore, as shown in FIG. 4, the reliability is also set so as to increase accordingly.

DOP (dilution of precision) is a value that indicates a position-fix accuracy calculated from the positioning of GPS satellites. A smaller DOP is likely associated with a comparatively highly accurate GPS distance and GPS heading. Therefore, as shown in FIG. 4, the reliability is also set so as to increase accordingly. Note that a DOP value of 1.0 is the best value. Types of DOP include geometrical dilution of precision (GDOP), horizontal dilution of precision (HDOP), position dilution of precision (PDOP), and relative dilution of precision (RDOP). The present example uses HDOP, but other types may be used alone or in combination. DOP is calculated by the GPS reception device 14.

The GPS/estimated path position coincidence based on inter-coordinate distances is specified in FIG. 4. If the distance degree of coincidence with the estimated path is high, the accuracy of the GPS distance can also be considered high. Therefore, the reliability of the GPS/estimated path position coincidence based on inter-coordinate distances is also set so as to increase accordingly.

The GPS/estimated path position coincidence based on inter-coordinate distances is calculated as follows.

(a) A GPS reliability calculation position (latest GPS positioning point) is designated as a base point. A base point for the estimated path is similarly set to an estimated path position to be measured that corresponds to the GPS base point.

(b) Ten GPS positioning points are acquired at intervals of 10 meters or more from the GPS base point position, and the distances between the coordinates of the positioning points and the base point (inter-coordinate distances) are calculated. Likewise for the estimated path, the distances between the coordinates of the positions corresponding to the GPS positioning points and the base point of the estimated position are calculated.

(c) The difference between the inter-coordinate distances of corresponding GPS positions (positioning points) and estimated positions as calculated at (b) are calculated for each positioning point, and the sum of the square of each difference is found to calculate an average value (correlation value). Reliability is determined from this correlation value.

The GPS/estimated path position coincidence based on inter-coordinate headings is specified in FIG. 4. Namely, if the heading degree of coincidence with the estimated path is high, the accuracy of the GPS heading can also be considered high. Therefore, the reliability of the GPS/estimated path position coincidence based on inter-coordinate headings is also set so as to increase accordingly.

The GPS/estimated path position coincidence based on inter-coordinate headings is calculated as follows.

(a) A maximum of 10 GPS positioning points at intervals of 10 meters or more from the GPS reliability calculation position (latest GPS positioning point) are acquired. Based on the coordinates between two adjacent points, the heading between the two points is calculated. Note that in the present example, the intervals are set to 10 meters or more because a smaller interval between compared points will result in even slight deviations causing large changes to the heading. Likewise for the estimated path, based on the coordinates between two adjacent points among the positions corresponding to the GPS positioning points, the heading between the two points is calculated.

(b) The difference between adjacent headings among the headings calculated based on the GPS positioning points is found to calculate the estimated heading variation amount. Likewise for the estimated path, the difference between adjacent headings among the headings calculated based on the points is found to calculate the heading variation amount.

(c) The differences between corresponding GPS and estimated heading variation amounts as calculated at (b) are calculated for each point, and the sum of the square of each difference is found to calculate an average value (correlation value). Reliability is determined from this correlation value.

After finding the reliability of each factor as described above, the reliability of the final estimated heading and distance, and GPS heading and distance are calculated as average values of reliability for each factor. For example, regarding the reliability of the estimated heading, if the previous reliability of the estimated heading is 4, the reliability of the speculative cumulative heading error is 3, and the reliability of the gyro sensitivity learning state is 3, the average value of the reliability of these three factors is 3.33.

When the speculative heading error shown in FIG. 2A is calculated, a value of 3 that is rounded off from the calculated average value of 3.33 is set as the reliability (wherein an average value of 3.4 is rounded down to 3 and an average value of 3.5 is rounded up to 4, for example). Thus, the speculative heading error that corresponds to the reliability of 3 is within 10 degrees. Note that in order to further increase accuracy, the rules for rounding the calculated average value may be modified such that, for example, an average value of 3.5 is rounded down to 3 and an average value of 3.6 is rounded up to 4, or an average value of 3.6 is rounded down to 3 and an average value of 3.7 is rounded up to 4, or the average value may be rounded down to the nearest whole number.

The reliability of each factor may also be weighted. In such case, the weight of the previous reliability may be higher than that for other factors. For example, the previous reliability may have 1.5 times more weight, the reliability of the speculative cumulative heading error 0.8 times less weight, and the reliability of the gyro sensitivity learning state 0.7 times less weight. Based on the reliability calculated for each factor, a final reliability may be determined using a fuzzy control.

In the navigation device that is configured in this manner, route guidance is performed as described below.

The navigation device detects the current position using the current position detection device 10, reads map information relating to the periphery of the current position from the map data file 51 in, the information storage device 50, and displays the read map information on the display 42. When a destination is input through the input device 41, the information processing control device 20 searches for (calculates) a plurality of travel route candidates from the current position to the destination and displays the travel route candidates on the map displayed on the display 42. Then, when the driver selects one of the travel routes, the selected travel route is stored in the RAM 24. Thus, a travel route is obtained (travel route acquisition unit). Note that the information processing control device 20 may also acquire the travel route by transmitting the current position of the vehicle (or a departure point that is input) and the destination to an information processing center and receiving a travel route to the destination that has been found by the information processing center.

In this case, communication of the destination and travel route is performed by wireless communication via the communication interface 25.

Further, a travel route from the departure point to the destination may be searched using an information processing device such as a home personal computer or the like, whereupon the travel route is stored in a storage medium such as USB memory and obtained via a corresponding storage medium reading device. The storage medium reading device in this case is connected to the information processing control device 20 through the transmission line 45. While the vehicle is moving, route guidance is performed by tracking the current position detected by the current position detection device 10.

The route guidance specifies the vehicle's position on the map by performing map matching between the road data that corresponds to the chosen route and the current position that is detected by the current position detection device 10, then displays the chosen route and a current position mark that indicates the current position of the vehicle on the map of the area surrounding the current position of the vehicle, which is displayed on the display 42.

Based on the relationship between the chosen route and the current position, a determination is made as to whether guidance is necessary. For example, in a case where the vehicle continues moving straight ahead for more than a predetermined distance, a determination is made as to whether route guidance regarding a route change point or the like and heading guidance are necessary. If the guidance is necessary, the guidance is provided by a display on the display 42 and by audio.

The map matching process that is performed by the navigation device structured in this manner will be described next.

Figure 5:
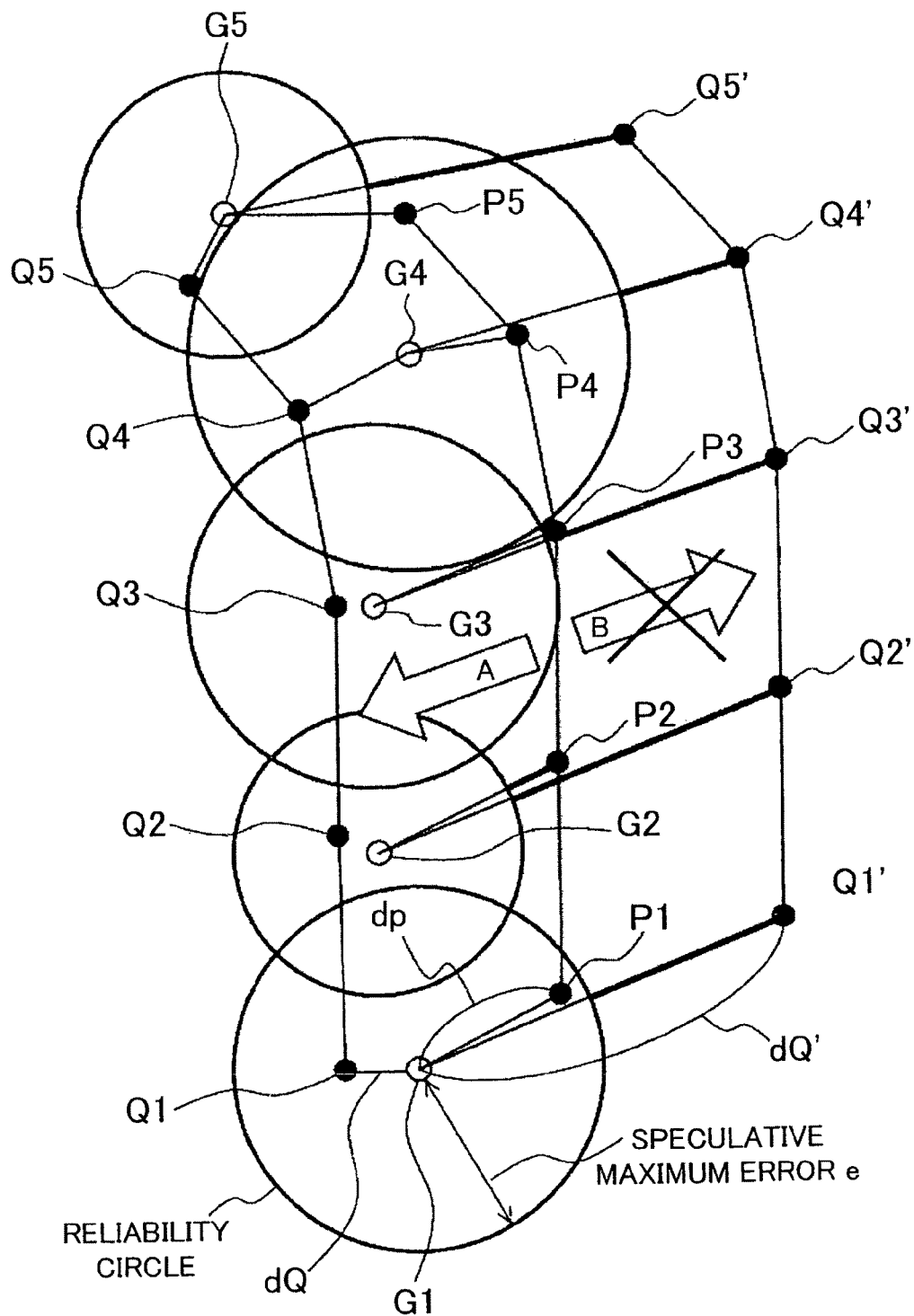
FIG. 5 is an explanatory drawing of correlation values between a GPS path and an estimated path before and after correction.

FIG. 5 is an explanatory drawing of correlation values between the GPS path and the estimated path before and after correction. As shown in FIG. 5, with respect to a GPS position G1 based on GPS positioning, P1 is an estimated position based on dead reckoning navigation that is measured at the GPS positioning point, and Q1 and Q1' are candidate points on a road that corresponds to the estimated position P1. A reliability circle is calculated that uses a speculative maximum error e with respect to the GPS position G1 as its radius. The estimated position P1 and the candidate point Q1 are inside the reliability circle. Therefore, a point correlation value between the two points P1, Q1 with respect to the GPS position G1 is zero. Meanwhile, the candidate point Q1' is outside the reliability circle. Therefore, a squared value of the distance from the candidate point Q1' to the reliability circle is set as a point correlation value s1 with respect to the GPS position G1.

In FIG. 5, among line segments that link the GPS position G1 and the candidate point Q1', a square value of the distance shown by a bold line is the point correlation value s1. The point correlation value s is calculated using equation (1) below.

$$s = (\max(0, d-e))^2 \quad (1)$$

Here, d represents respective distances dp, dQ, dQ' between the GPS position G and the estimated position P, and the candidate points Q, Q', and e is the speculative maximum error at the GPS position G1. Note that max(a, b) specifies the larger value among a and b.

Based on equation (1) above, if d−e>0, that is, if the estimated position and the candidate point are outside the reliability circle, then the point correlation value s is the square value of a distance d−e to the reliability circle. However, if d−e≦0, that is, if the estimated position and the candidate point are inside or on the reliability circle, then the point correlation value s is zero. Thus, similar to the calculation of the point correlation value s1 of the estimated position P1 and the candidate point Q1 (or Q1') with respect to the GPS position G1, point correlation values s2 to s5 are also found for estimated positions P2 to P5 and candidate points Q2 to Q5 (or candidate points Q2' to Q5') with respect to other GPS positions G2 to G5 following the GPS path.

For the calculation of each point correlation value s, using the GPS position G1 as the origin and the GPS positions G2, G3 and so on in accordance with vehicle movement, the point correlation values s1, s2, s3 and so on are sequentially found. Note that the point correlation values s1 and so on from the GPS position G1 onward may be calculated after traveling a predetermined segment from the GPS position G1 (e.g. up to a GPS position G5).

The correlation value Sp of the estimated path and the correlation value Sq of the candidate path (path based on the candidate point), with respect to the GPS path, are each expressed using equation (2) below, where S is substituted to represent both the correlation values Sp, Sq:

$$S = s1 + s2 + s3 \ldots sn = \Sigma(\max(0, d-e))^2 \quad (2)$$

As shown in FIG. 5, the estimated position P2 among the estimated positions P1 to P5 of the estimated path is outside the reliability circle, while all the candidate points Q1 to Q5 of the candidate path are located inside the reliability circle. Therefore, regarding the correlation values with respect to the GPS path, the reliability Sp of the estimated path is greater than the reliability Sq of the candidate path. Thus, if the candidate path with respect to the estimated path corresponds to Q1 to Q5, a correction would reduce (improve) the correlation value, so as shown by an arrow A in FIG. 5, the estimated path is corrected to the candidate path. In other words, the candidate path is set as the post-correction estimated path. However, if the candidate path with respect to the estimated path corresponds to Q1' to Q5', the candidate points are all far outside the reliability circle. Therefore, the reliability Sp of the estimated path is less than the reliability Sq of the candidate path. Thus, if the estimated path is corrected to the candidate path, it is highly likely that the correction would be to a path less correct than the estimated path found by dead reckoning navigation. Accordingly, as shown by an arrow B in FIG. 5, the correction is not made (the correction is suppressed) and the original estimated path (based on the estimated positions P1 to P5) is saved unchanged.

Figure 6:
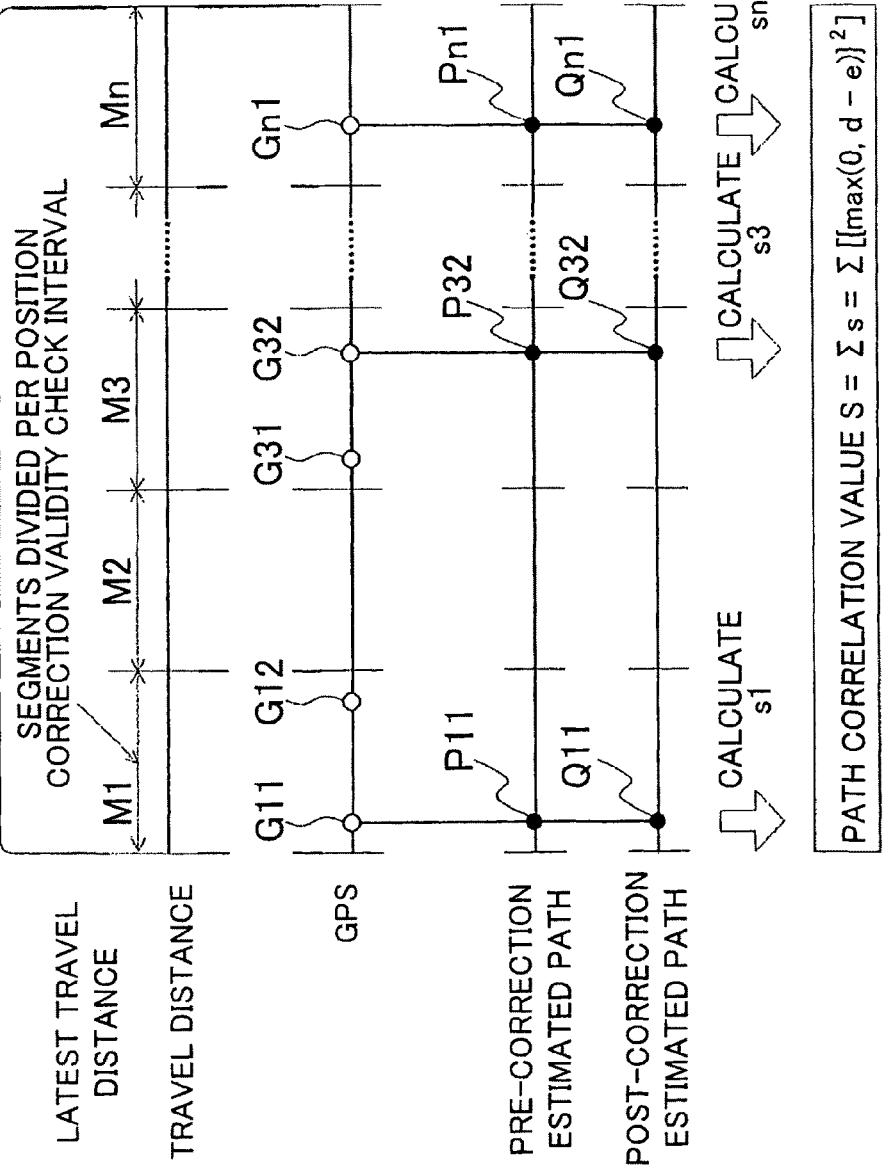
FIG. 6 is an explanatory drawing of a method for extracting a GPS position G, an estimated position P, and a candidate point Q, which are objects used to calculate the correlation values.

FIG. 6 shows a method for extracting the GPS position G, the estimated position P, and the candidate point Q, which are objects used to calculate the correlation value. As shown in FIG. 6, the validity of position corrections are checked (point correlation values are calculated) in intervals (per a predetermined distance L). Using a predetermined position as an origin, segments M1, M2 and so on are divided in order from the origin at every predetermined distance L. It should be noted that there is no need to divide into segments if the GPS positions G are sequentially determined in accordance with vehicle movement from the origin and the point correlation values s of the estimated positions P and the candidate points Q are calculated accordingly. In such case, the GPS position for calculating the next point correlation value s is determined each time the vehicle travels L (m) from the origin. From the divided segments, for example, from within the segment M1, a GPS position G11 that was found from an initial GPS reception result is extracted as an object (calculation object) for calculating the point correlation value s.

An estimated position P11 and a candidate point Q11 on a travel path that corresponds to a travel distance from the GPS reception result for the determined GPS position G11 (a travel distance from an origin or a start point of a segment M) are then extracted as objects (calculation objects) for calculating the point correlation value s. As in the segment M1, when two GPS positions G11, G12 are measured within the same segment, the position measured first is extracted as the GPS position G. However, as in the segment M2, no GPS position G is extracted from the segment if there is no GPS reception result within the segment. Further, as in the segment M3, even though there is a GPS reception result (GPS position G31), the GPS position G31 is not extracted because the speculative maximum error e cannot be calculated. In this case, if a GPS position G32 (reception result) at which the speculative maximum error e can be calculated exists after the GPS position G31 within the segment M3, the GPS position G32 is extracted.

Figure 7:
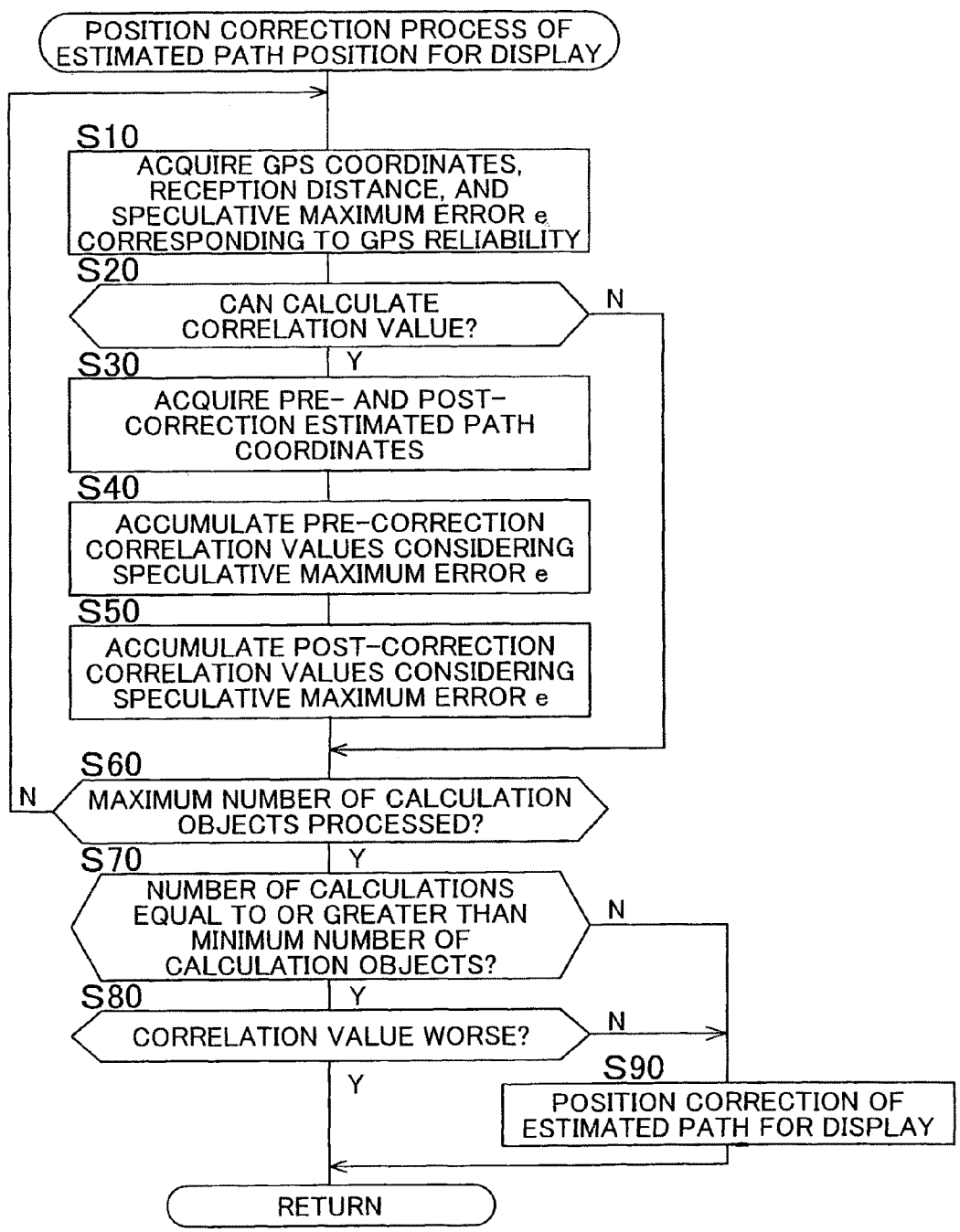
FIG. 7 is a flowchart of a position correction process for an estimated path to be displayed.

Next, a position correction process of the estimated path for display according to the present example, which is performed in the map matching process, will be described with reference to an algorithm shown in the flowchart in FIG. 7. The exemplary process may be implemented, for example, by one or more components of the above-described navigation device. For example, the exemplary method may be implemented by the CPU 21 and or information processing control device 20 executing a computer program stored in the first ROM 22, second RAM 24, and/or the information storage device 50. However, even though the exemplary structure of the above-described navigation device may be referenced in the description, it should be appreciated that the structure is exemplary and the exemplary process need not be limited by any of the above-described exemplary structure.

The information processing control device 20 acquires GPS coordinates (GPS position Gn) and a reception distance from the GPS reception device 14, and also acquires the speculative maximum error e that corresponds to the GPS reliability (S10). The speculative maximum error e is acquired by calculation using the method described based on FIGS. 2 to 4.

The information processing control device 20 then determines whether the correlation value can be calculated from the various values acquired at S10 (S20). That is, if the various information can be acquired and the vehicle is within a fixed distance from the GPS reception position, it is determined that calculation of the correlation value is possible. If the information processing control device 20 determines that the correlation value cannot be calculated (S20: N), the process proceeds to S60. However, if it is determined that the correlation value can be calculated (S20: Y), the information processing control device 20 acquires the pre- and post-correction estimated path coordinates, namely, an estimated position Pn and a candidate point Qn that correspond to the GPS position Gn acquired at S10 (S30).

The information processing control device 20 subsequently calculates the point correlation value s of the estimated position Pn with respect to the GPS position Gn that considers the speculative maximum error e. The information processing control device 20 adds this to a total of the point correlation values calculated in the segments M1 to Mn−1 and saves the total in a predetermined area of the RAM 24 (S40). The information processing control device 20 also calculates the point correlation value s of the candidate point Qn with respect to the GPS position Gn that considers the speculative maximum error e. The information processing control device 20 adds this to a total of the point correlation values calculated in the segments M1 to Mn−1 and saves the total in a predetermined area of the RAM 24 (S50). Next, the information processing control device 20 determines whether the maximum number of calculation objects has been processed (S60). Specifically, if w is the maximum number of segments used for checking the validity of a position correction, the information processing control device 20 determines whether extraction of the GPS position G has been performed for each segment M from M1 to Mw.

If the maximum number of calculation objects for w has not been processed (S60: N), the information processing control device 20 returns to S10 and acquires information for the next GPS position G. In such case, if extraction within the segment Mn is complete or if extraction is not complete but the process has moved to a next segment M+1, the information for the next GPS position G is information for the initial GPS position G in the next segment Mn+1. However, if extraction within the segment Mn is not complete, such information is information for the next GPS position G within the segment Mn.

If the maximum number of calculation objects for w has been processed (S60: Y), the information processing control device 20 determines whether the number of calculations (number of points where the point correlation value s was calculated) is equal to or greater than a minimum number of calculation objects (S70). The minimum number of calculation objects may be any number, and in the present example, a minimum number of three is set as an example.

If the number of calculations is less than the minimum number of calculation objects (S70: N), the information processing control device 20 does not suppress correction because the path correlation value S is more susceptible to the effects of a temporary GPS position displacement and thus less reliable. The information processing control device 20 subsequently proceeds to S90 and performs a correction. However, if the number of calculations is equal to or greater than the minimum number of calculation objects (S70: Y), the information processing control device 20 determines, based on a comparison of the correlation value Sp of the estimated path and the correlation value Sq of the candidate path, whether the correlation value becomes worse when the estimated path is corrected to the candidate path (S80).

If the correlation value Sq of the candidate path is greater than the correlation value Sp of the estimated path, that is, if the correlation value becomes worse (S80: Y), the information processing control device 20 does not correct the estimated path. Instead, the information processing control device 20 leaves the estimated path found by dead reckoning navigation unchanged and returns to the main routine. However, if the correlation value Sq of the candidate path is equal to or less than the correlation value Sp of the estimated path, that is, if the correlation value does not become worse (S80: N), the information processing control device 20 performs a correction by moving the estimated path P to the candidate path Q (S90) and then returns to the main routine. Note that based on the correction of the estimated path (S90), the vehicle travel path and the vehicle current position mark displayed on the display 42 of the navigation device are both moved to the candidate path (post-correction estimated path).

Figure 8:
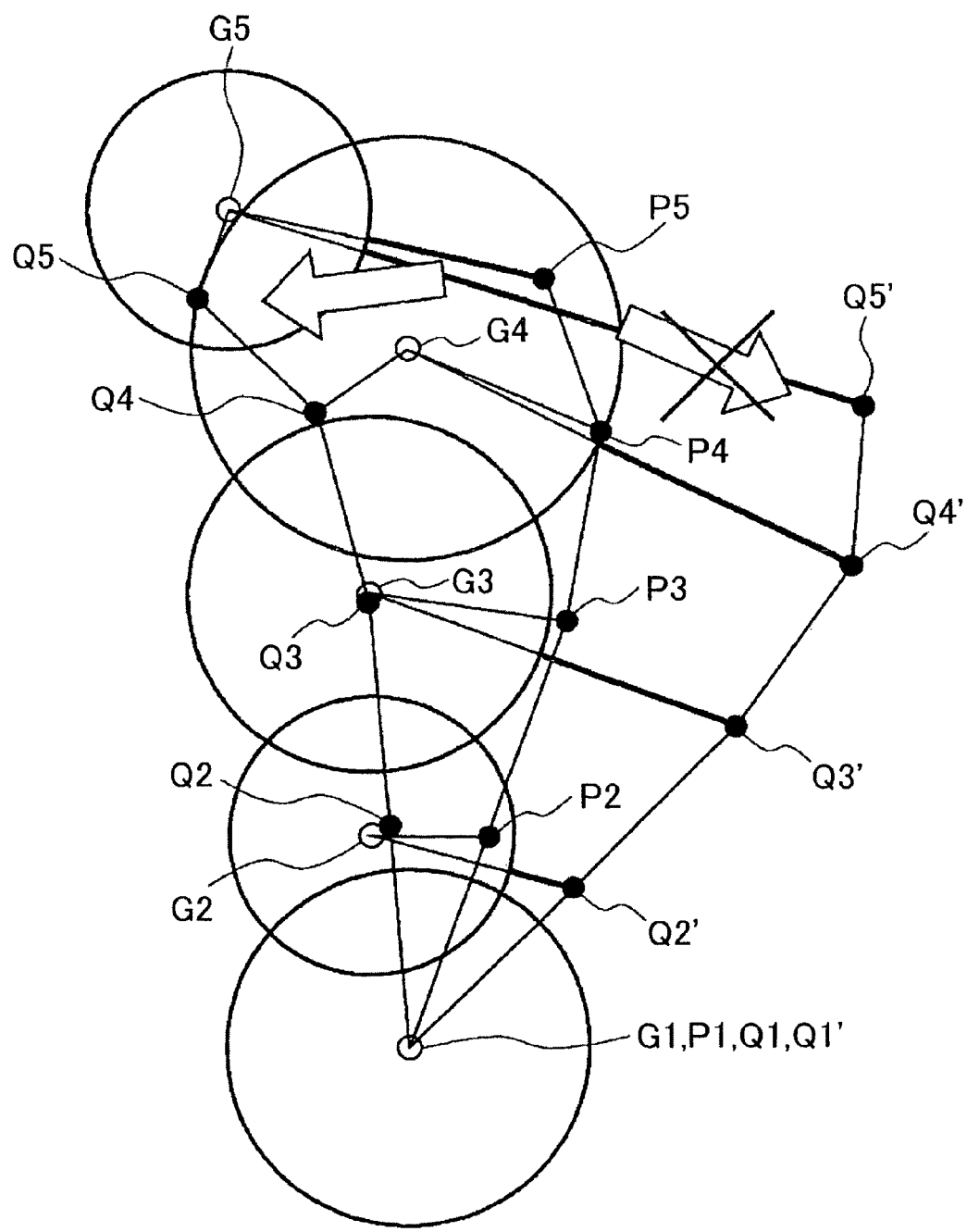
FIG. 8 is an explanatory drawing of a heading correction of the estimated path using correlation values with respect to the GPS position.

Next, a heading correction of the estimated path using correlation values with respect to the GPS position G will be described with reference to FIG. 8. A heading correction of the estimated path is a correction that calculates the difference (angular difference) between the heading of the estimated path and the heading of the candidate path, and rotates the estimated path around a rotation origin by an amount corresponding to the heading difference. Thus, as shown in FIG. 8, in order to compare the heading of the estimated path and the heading of the candidate path, the correlation value S of both paths is calculated by temporarily translating the entire estimated and candidate paths such that a rotation center (an estimated path origin P1 and a candidate path origin Q1) overlaps with an origin G1 of the GPS position.

Similar to the position correction explained in FIG. 5, the estimated path correlation value Sp that is an accumulation of the point correlation values s at the estimated positions P2 to P5 and the candidate path correlation value Sq that is an accumulation of the point correlation values s at the candidate points Q2 to Q5, with respect to the GPS positions G2 to G5, are calculated. As in the case of the candidate points Q1' to Q5' in FIG. 5, a heading correction is not performed if the correlation value Sq of the estimated path is greater than the correlation value Sp of the candidate path (if the correlation value becomes worse). However, as in the case of the candidate points Q1 to Q5 in FIG. 5, if the correlation value Sq of the candidate path is equal to or less than the correlation value Sp of the estimated path (if the correlation value is the same or improves), a heading correction is made by rotating the estimated path prior to the temporary move, which used the GPS position G1 as an origin, at the estimated position P1 by an amount corresponding to the difference with the heading of the candidate path.

Figure 9:
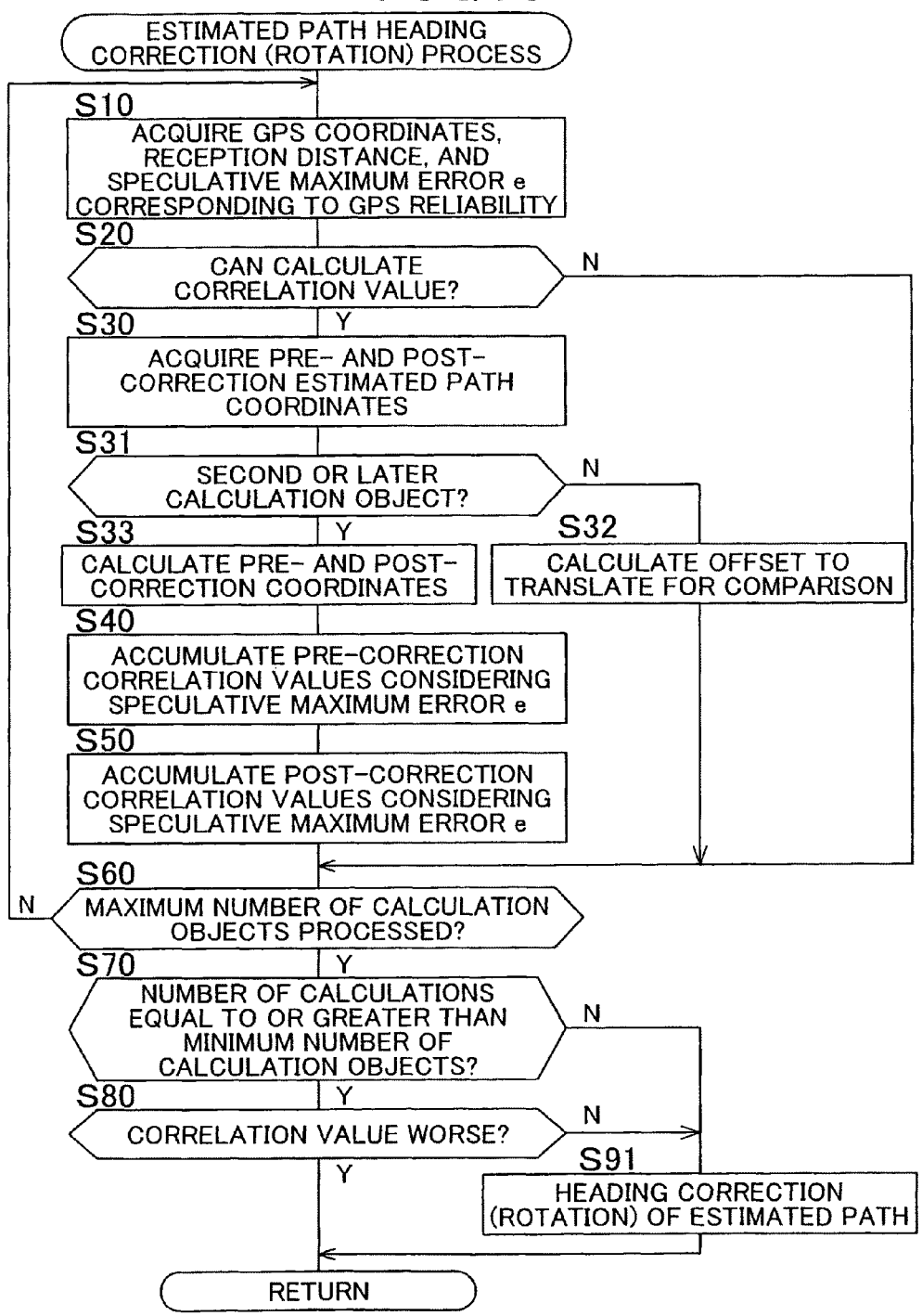
FIG. 9 is a flowchart of a heading correction process.

FIG. 9 is a flowchart that shows in detail an algorithm of a process for heading correction according to the present example. The exemplary process may be implemented, for example, by one or more components of the above-described navigation device. For example, the exemplary method may be implemented by the CPU 21 and or information processing control device 20 executing a computer program stored in the first ROM 22, second RAM 24, and/or the information storage device 50. However, even though the exemplary structure of the above-described navigation device may be referenced in the description, it should be appreciated that the structure is exemplary and the exemplary process need not be limited by any of the above-described exemplary structure. Note that the same step numbers are used for processing identical to that for position correction as explained in FIG. 7, and accompanying descriptions are omitted here.

The information processing control device 20, similar to the case of a position correction, acquires GPS coordinates (GPS position Gn) and the reception distance from the GPS reception device 14, and the speculative maximum error e (S10), and determines whether calculation of the correlation value is possible (S20). If possible (S20: Y), the information processing control device 20 acquires pre- and post-correction estimated path coordinates, namely, the estimated position Pn and the candidate point Qn that correspond to the GPS position Gn (S30).

The information processing control device 20 next determines whether the calculation object, that is, the GPS position Gn, the estimated position Pn, and the candidate point Qn, is an origin or a second or later point (S31). If the calculation object is not the second or later point (if the calculation object is an origin, i.e., n=1) (S31: N), the information processing control device 20 calculates an offset to translate the paths for comparison (S32). Specifically, the information processing control device 20 calculates a value that subtracts the coordinate values of the GPS position G1 from the coordinate values of the estimated position P1 (DXp, DYp), and a value that subtracts the coordinate values of the GPS position G1 from the coordinate values of the candidate point Q1 (DXq, DYq). The information processing control device 20 then sets a movement amount (offset) for translating the estimated position P1 and the candidate point Q1 to a location that overlaps with the GPS position G1.

However, if the calculation object is a second or later point (n≧2) (S31: Y), the information processing control device 20 calculates pre- and post-correction coordinates (S33). Namely, using the coordinates of the pre-correction estimated position Pn for heading correction, the information processing control device 20 adds the offset calculated at S32 (ΔXp, ΔYp) to the coordinates of the estimated position Pn (Xpn, Ypn) in order to calculate the coordinates of the post-correction estimated position Pn (Xpn+ΔXp, Ypn+ΔYp). Likewise, using the coordinates of the post-correction candidate point Qn for heading correction, the information processing control device 20 adds the offset calculated at S32 (ΔXq, ΔYq) to the coordinates of the candidate point Qn (Xqn, Yqn) in order to calculate the coordinates of the post-correction candidate point Qn (Xqn+ΔXq, Yqn+ΔYq).

The information processing control device 20 subsequently calculates the point correlation value s of the estimated position Pn (coordinates calculated at S33) with respect to the GPS position Gn that considers the speculative maximum error e. The information processing control device 20 adds this to a total of the point correlation values calculated in the segments M1 to Mn−1 and saves the total in a predetermined area of the RAM 24 (S40). The information processing control device 20 also calculates the point correlation value s of the candidate point Qn (coordinates calculated at S33) with respect to the GPS position Gn that considers the speculative maximum error e. The information processing control device 20 adds this to a total of the point correlation values calculated in the segments M1 to Mn−1 and saves the total in a predetermined area of the RAM 24 (S50).

Next, the information processing control device 20 processes the maximum number of calculation objects (S60: Y). If the number of points at which the point correlation value s was calculated is equal to or greater than the minimum number of calculation objects (S70: Y), the information processing control device 20 determines, based on a comparison of the correlation value Sp of the estimated path and the correlation value Sq of the candidate path, whether the correlation value becomes worse when the estimated path is corrected to the candidate path (S80).

If the correlation value Sq of the candidate path is greater than the correlation value Sp of the estimated path, that is, if the correlation value becomes worse (S80: Y), the information processing control device 20 does not correct the heading of the estimated path. Instead, the information processing control device 20 leaves the estimated path found by dead reckoning navigation unchanged and returns to the main routine. However, if the correlation value Sq of the candidate path is equal to or less than the correlation value Sp of the estimated path, that is, if the correlation value does not become worse (S80: N), the information processing control device 20 corrects (rotates) the heading of the estimated path (S91) and then returns to the main routine.

In the heading correction of the estimated path, the non-offset estimated path is rotated at the estimated position P1 by an amount corresponding to the heading difference between the heading of the estimated path and the heading of the candidate path. Here, in the present example, the heading difference uses an angle formed by a line segment that links the estimated position P1 and an estimated position Pw (a final point; w=5 in the example of FIG. 8), and a line segment that links the candidate point Q1 and the candidate point Q5. However, the heading difference may be an angle formed by a line segment that links the estimated position P1 and the estimated position P2, and a line segment that links the candidate point Q1 and the candidate point Q2. Alternatively, the heading difference may be an average value of the angles formed by corresponding line segment pairs among respective line segments that link the estimated position P1 to the estimated positions P2, P3 and so on, and respective line segments that link the candidate point Q1 to the candidate points Q2, Q3 and so on.

Next, suppression (restriction) of a correction according to the present example during a position correction and a heading correction of the estimated path will be described using a case where a false correction is prone to occur, namely, an example where the vehicle moves in a parking area whose periphery is surrounded by roads.

Figure 10A:
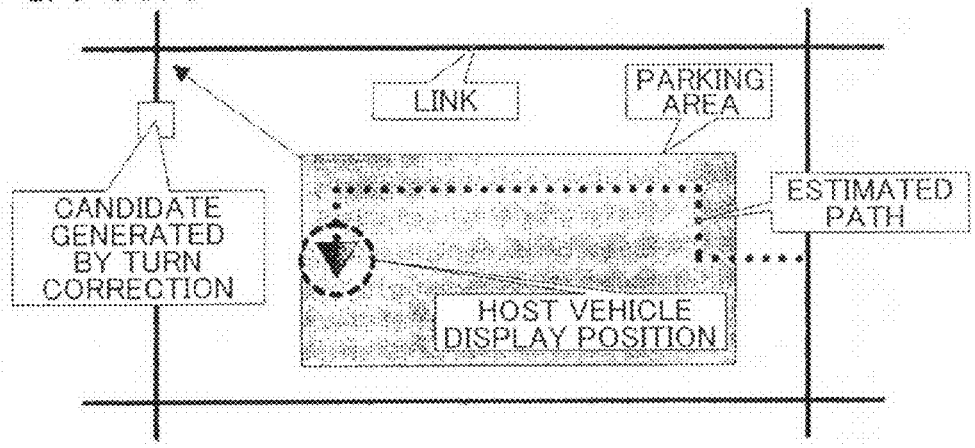
FIGS. 10A to 10C are explanatory drawings that show conventional map matching states when the position correction according to the present example is not applied.
Figure 10B:
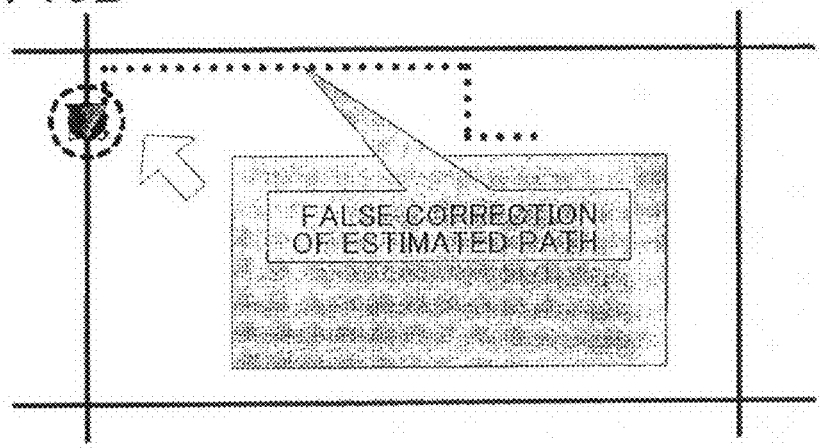
Figure 10C:
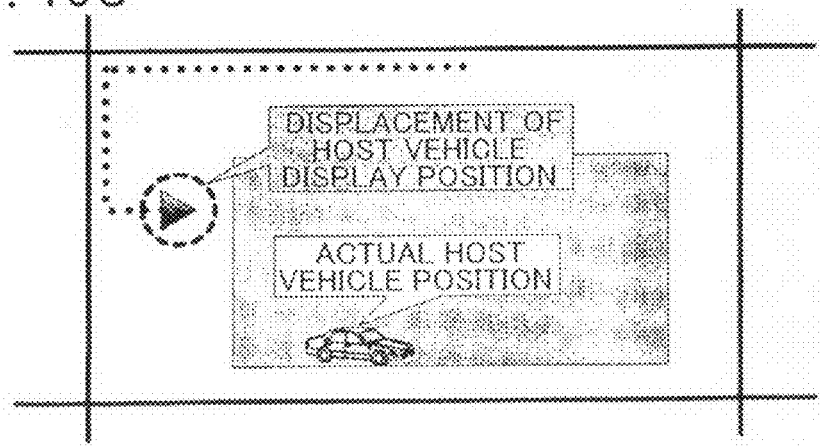

FIGS. 10A to 10C show conventional map matching states, wherein a position correction based on correlation values that consider the speculative maximum error e with respect to the GPS path according to the present example is not applied. As shown in FIG. 10A, the actual vehicle enters the parking area from the right side in the figure and makes a right turn, a left turn, and then another left turn during travel. This travel path is correctly estimated as the estimated path shown by a dotted line. In this state, a current position mark that is a triangle surrounded by a dashed circle is displayed as a host vehicle display position in accordance with the estimated path on the map shown on the display 42.

Meanwhile, because the candidate point is set and moved on roads (links), the candidate point here is ultimately moved in accordance with the movement of the vehicle to a position shown by a white square in the figure, after assuming the vehicle traveled from the road on the right side of the parking area to the top road and then, as its final left turn, made a left turn at the top-left intersection.

In this state, that is, with the candidate point moved to the position of the white square after the final left turn of the vehicle, conventional map matching as shown in FIG. 10B results in a false correction. Specifically, based on the coincidence of the travel path and the road shape (candidate path), a correction is performed that translates the estimated path such that the current position mark (latest estimated position) of the vehicle matches the candidate point (white square) on the road, and results in a false correction of the estimated path.

As shown in FIG. 10C, when the vehicle turns lefts again in the parking area, the host vehicle display position and the actual host vehicle position no longer match due to the false correction in FIG. 10B, and displacement of the travel path occurs.

Figure 11A:
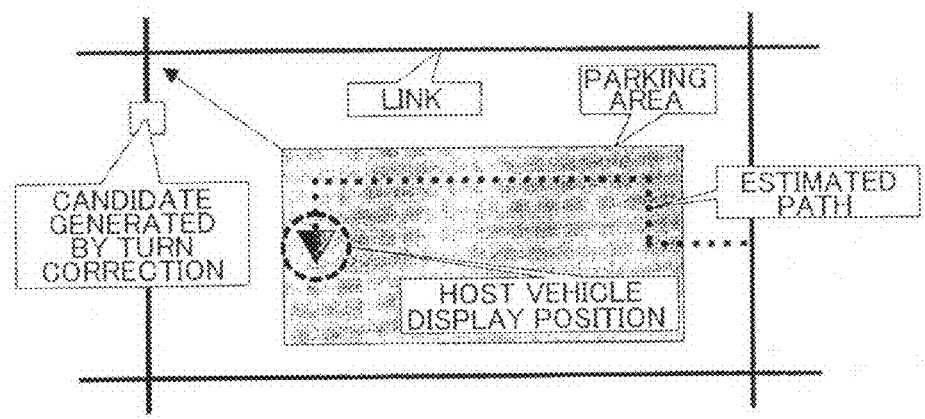
FIGS. 11A to 11C are explanatory drawings that show map matching states when the position correction based on correlation values that consider a speculative maximum error e with respect to the GPS path is applied.
Figure 11B:
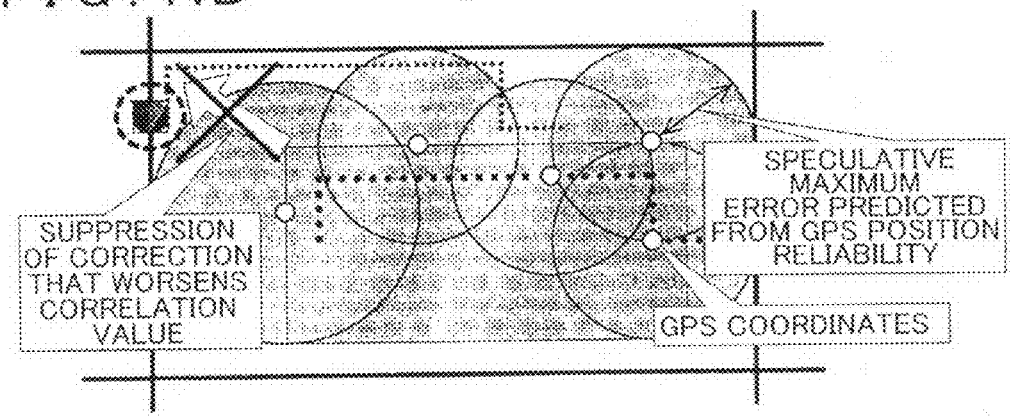
Figure 11C:
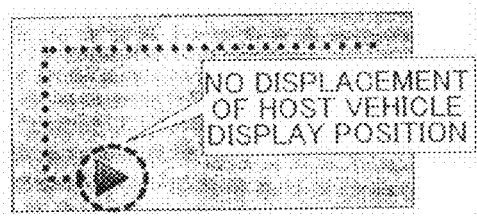

FIGS. 11A to 11C show map matching states according to the present example, wherein a position correction based on correlation values that consider the speculative maximum error e with respect to the GPS path is applied. FIG. 11A shows the same state as FIG. 10A. In this state, when map matching according to the present example is performed, that is, when the estimated path correction process is applied, the estimated positions of the estimated path are included within the reliability circles based on the speculative maximum error e at each GPS position (GPS coordinate) as shown in FIG. 11B. Therefore, the correlation value Sp of the estimated path is zero. Conversely, the candidate path set on the roads (links) has many portions that are outside the reliability circles. Therefore, the correlation value Sq of the candidate path is large. As a consequence, in the map matching process, a correction in FIG. 11B makes the correlation value worse. There is thus no correction of the estimated path to the candidate path.

The result as shown in FIG. 11C is that no displacement occurs in the estimated path and the host vehicle position display with respect to subsequent vehicle movement, and both remain the correct path and position.

Figure 12A:
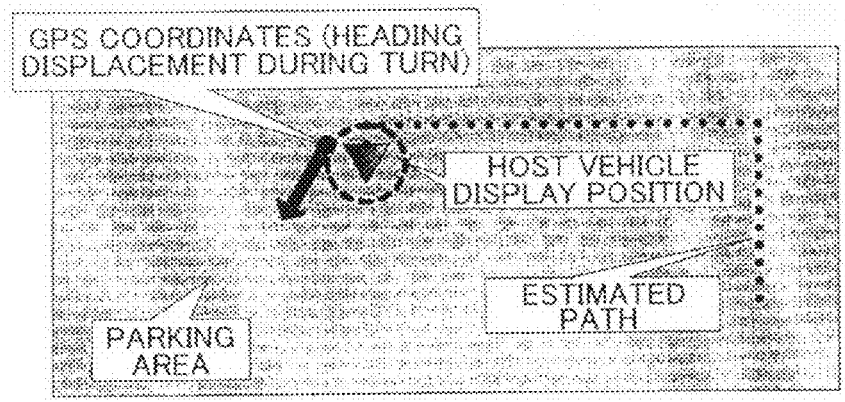
FIGS. 12A to 12C are explanatory drawings that show heading correction states when the present example is not applied.
Figure 12B:
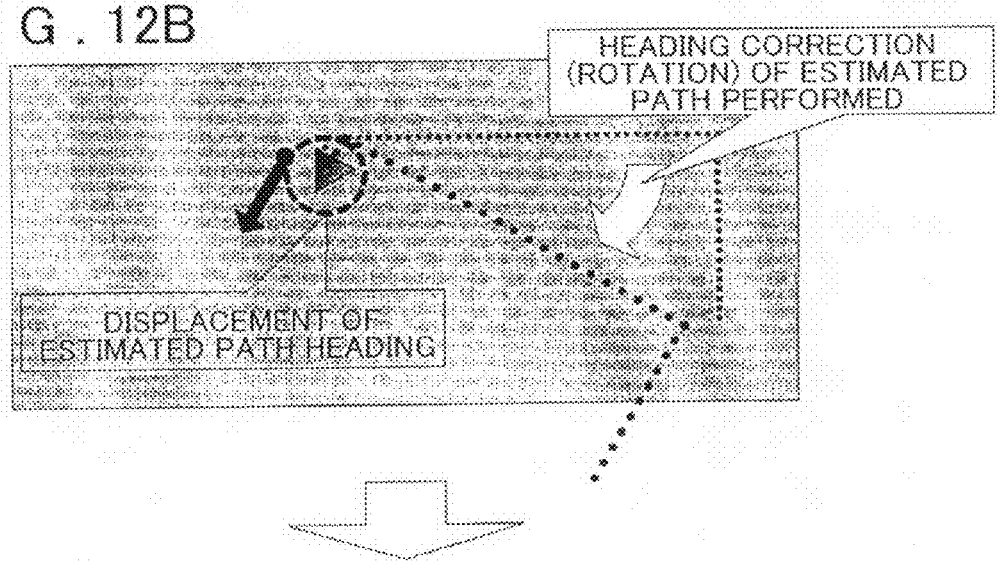
Figure 12C:
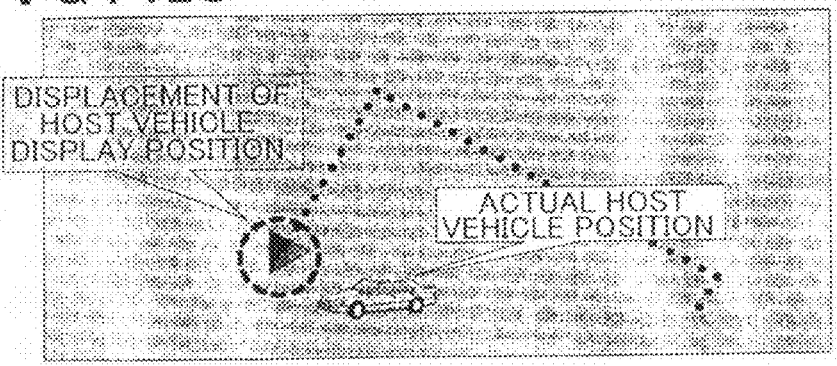

FIGS. 12A to 12C show heading correction states according to conventional map matching when the present example is not applied. As shown in FIG. 12A, the heading becomes displaced during turning at the GPS coordinates when the vehicle turns left in the parking area. In this case, according to conventional map matching, as shown in FIG. 12A, a correction is made that rotates the estimated path at the turn point by an amount corresponding to a heading difference with the GPS heading. Therefore, as shown in FIG. 12C, the subsequent travel path and the host vehicle position mark both become displaced.

Figure 13A:
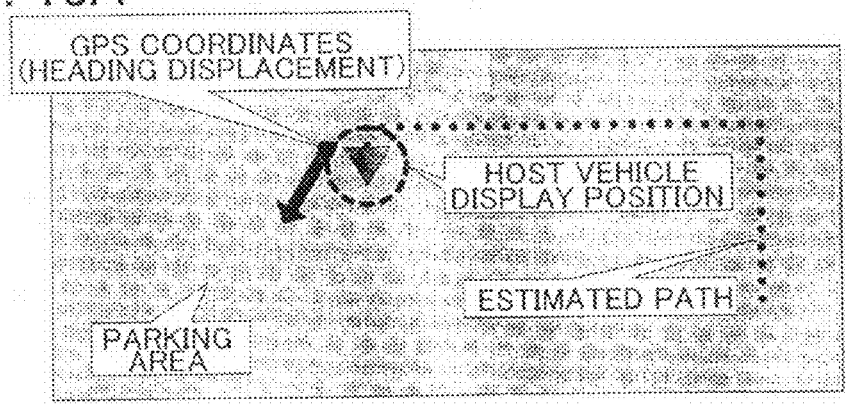
FIGS. 13A to 13C are explanatory drawings that show map matching states according to the present example when the heading correction based on correlation values that consider the speculative maximum error e with respect to the GPS path is applied.
Figure 13B:
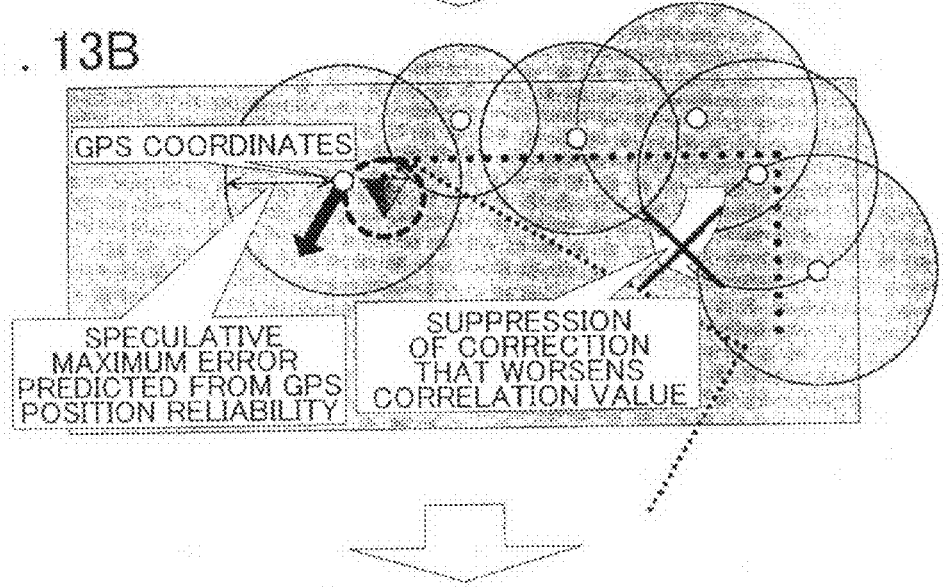
Figure 13C:
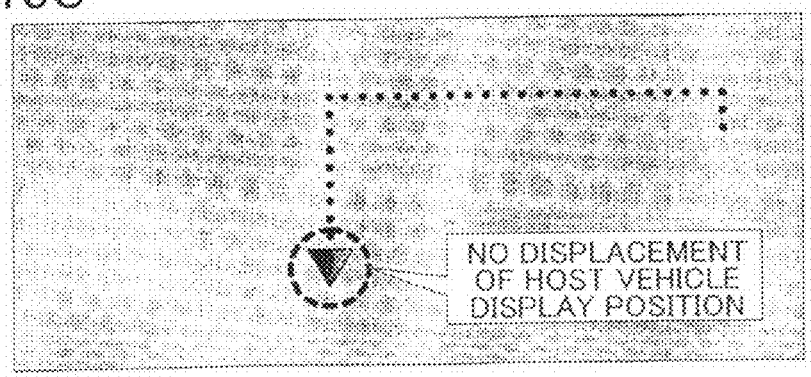

FIGS. 13A to 13C show map matching states according to the present example, wherein a heading correction based on correlation values that consider the speculative maximum error e with respect to the GPS path is applied. FIG. 13A shows the same state as FIG. 12A. In this state, when map matching according to the present example is performed, that is, when the estimated path correction process (rotation) is applied, the estimated positions of the estimated path are included within the reliability circles based on the speculative maximum error e at each GPS position (GPS coordinate) as shown in FIG. 13B. Therefore, the correlation value Sp of the estimated path is zero.

Conversely, the post-rotation candidate path has many portions that are outside the reliability circles. Therefore, the correlation value Sq of the candidate path is large.

As a consequence, in the map matching process, a correction in FIG. 13B makes the correlation value worse. There is thus no correction of the estimated path to the candidate path.

The result as shown in FIG. 13C is that no displacement occurs in the estimated path and the host vehicle position display with respect to subsequent vehicle movement, and both remain the correct path and position.

An example of the navigation device and navigation program according to the present invention was described above, but the present invention is not limited to the example and examples described above, and may be subjected to various further modifications within the scope of the claims.

For example, in the example and modification described above, the speculative maximum error e serving as the radius of the reliability circle is determined based on the GPS reliability. However, an error circle based on the DOP of the GPS may be used. The speculative maximum error in such case is used as the radius of the error circle.

When calculating the point correlation value s in equation (1), a square value $(d-e)2$ of the distance from the estimated position P and the candidate point Q, which are outside the reliability circle, to the reliability circle is set as the point correlation value s. However, the point correlation value s need not be a square value, and the distance $(d-e)$ to the reliability circle may be used as the correlation value s instead, for example.

What is claimed is:

1. A navigation device that corrects an estimated path found by dead reckoning navigation, the navigation device comprising:
    a controller that:
        acquires a plurality of GPS positions based on GPS positioning;
        acquires a plurality of estimated positions and a plurality of candidate positions based on dead reckoning navigation, each of which respectively correspond to the acquired GPS positions;
        determines an estimated path that is made up of the plurality of estimated positions;
        determines a candidate path that is made up of the plurality of candidate positions;
        acquires a speculative maximum error that specifies a distance of an error range with respect to each GPS position;

calculates a point correlation value for each estimated position based on a distance between the estimated position and a reliability circle, the reliability circle having a radius equal to the acquired speculative maximum error;

calculates a correlation value of the estimated path that is a cumulative value of point correlation values calculated for each of the plurality of estimated positions;

calculates a correlation value for each candidate position based on a distance between the candidate position and the reliability circle;

calculates a correlation value of the candidate path that is a cumulative value of the point correlation values calculated for each of the plurality of candidate positions; and performs a correction of the estimated path that moves the estimated path if the correlation value of the candidate path is equal to or less than the correlation value of the estimated path, but does not perform the correction if the correlation value of the candidate path is greater than the correlation value of the estimated path.

2. The navigation device according to claim 1, wherein the controller:

performs the correction of the estimated path by translating a latest one of the plurality of estimated positions of the estimated path to a corresponding one of the plurality of candidate positions.

3. The navigation device according to claim 1, wherein the controller:

determines an estimated position that serves as an origin;

translates a candidate position by translating the estimated path and the candidate path so as to overlap with a corresponding one of the GPS positions;

calculates the correlation value of the estimated path based on the translated estimated path;

calculates the correlation value of the candidate path based on the translated candidate path; and if the correlation value of the candidate path is equal to or less than the correlation value of the estimated path, performs a heading correction of the estimated path by rotating the estimated path about the origin by an amount that corresponds to a heading difference between a heading of the estimated path and a heading of the candidate path.

4. The navigation device according to claim 1, wherein the controller:

performs a correction of the estimated path only if a number of the point correlation values that can be calculated with respect to a predetermined length of the estimated path is equal to or less than a predetermined number.

5. The navigation device according to claim 1, wherein:
the speculative maximum error is a radius of an error circle that is based on a dilution of precision of the GPS.

6. The navigation device according to claim 1, wherein:
the speculative maximum error for each GPS position is a distance that corresponds to a reliability calculated from:
the dilution of precision;
a distance between the estimated position corresponding to the GPS position and the GPS position; and
a difference between a heading according to a trajectory of the corresponding estimated position and a heading according to a trajectory of the GPS position.

7. A navigation method that corrects an estimated path found by dead reckoning navigation, the navigation method comprising:

acquiring, with a controller, a plurality of GPS positions based on GPS positioning;

acquiring, with the controller, a plurality of estimated positions and a plurality of candidate positions based on dead reckoning navigation, each of which respectively correspond to the acquired GPS positions;

determining, with the controller, an estimated path that is made up of the plurality of estimated positions;

determining, with the controller, a candidate path that is made up of the plurality of candidate positions;

acquiring, with the controller, a speculative maximum error that specifies a distance of an error range with respect to each GPS position;

calculating, with the controller, a point correlation value for each estimated position based on a distance between the estimated position and a reliability circle, the reliability circle having a radius equal to the acquired speculative maximum error;

calculating, with the controller, a correlation value of the estimated path that is a cumulative value of point correlation values calculated for each of the plurality of estimated positions;

calculating, with the controller, a correlation value for each candidate position based on a distance between the candidate position and the reliability circle;

calculating, with the controller, a correlation value of the candidate path that is a cumulative value of the point correlation values calculated for each of the plurality of candidate positions; and performing, with the controller, a correction of the estimated path that moves the estimated path if the correlation value of the candidate path is equal to or less than the correlation value of the estimated path, and not performing the correction if the correlation value of the candidate path is greater than the correlation value of the estimated path.

8. The navigation method according to claim 7, further comprising:

performing, with the controller, the correction of the estimated path by translating a latest one of the plurality of estimated positions of the estimated path to a corresponding one of the plurality of candidate positions.

9. The navigation method according to claim 7, further comprising:

determining, with the controller, an estimated position that serves as an origin;

translating, with the controller, a candidate position by translating the estimated path and the candidate path so as to overlap with a corresponding one of the GPS positions;

calculating, with the controller, the correlation value of the estimated path based on the translated estimated path;

calculating, with the controller, the correlation value of the candidate path based on the translated candidate path; and if the correlation value of the candidate path is equal to or less than the correlation value of the estimated path, performing, with the controller. a heading correction of the estimated path by rotating the estimated path about the origin by an amount that corresponds to a heading difference between a heading of the estimated path and a heading of the candidate path.

10. The navigation method according to claim 7, further comprising:

performing, with the controller, a correction of the estimated path only if a number of the point correlation values that can be calculated with respect to a predetermined length of the estimated path is equal to or less than a predetermined number.

11. The navigation method according to claim 7, wherein: the speculative maximum error is a radius of an error circle that is based on a dilution of precision of the GPS.

12. The navigation method according to claim 7, wherein: the speculative maximum error for each GPS position is a distance that corresponds to a reliability calculated from:
- the dilution of precision;
- a distance between the estimated position corresponding to the GPS position and the GPS position; and
- a difference between a heading according to a trajectory of the corresponding estimated position and a heading according to a trajectory of the GPS position.

13. A computer-readable storage medium storing a computer-executable program usable to provide navigation to a vehicle, the program comprising:
- instructions for acquiring a plurality of GPS positions based on GPS positioning;
- instructions for acquiring a plurality of estimated positions and a plurality of candidate positions based on dead reckoning navigation, each of which respectively correspond to the acquired GPS positions;
- instructions for determining an estimated path that is made up of the plurality of estimated positions;
- instructions for determining a candidate path that is made up of the plurality of candidate positions;
- instructions for acquiring a speculative maximum error that specifies a distance of an error range with respect to each GPS position;
- instructions for calculating a point correlation value for each estimated position based on a distance between the estimated position and a reliability circle, the reliability circle having a radius equal to the acquired speculative maximum error;
- instructions for calculating a correlation value of the estimated path that is a cumulative value of point correlation values calculated for each of the plurality of estimated positions;
- instructions for calculating a correlation value for each candidate position based on a distance between the candidate position and the reliability circle;
- instructions for calculating a correlation value of the candidate path that is a cumulative value of the point correlation values calculated for each of the plurality of candidate positions; and
- instructions for performing a correction of the estimated path that moves the estimated path if the correlation value of the candidate path is equal to or less than the correlation value of the estimated path, and not performing the correction if the correlation value of the candidate path is greater than the correlation value of the estimated path.

\* \* \* \* \*